United States Patent [19]

Kameda et al.

[11] Patent Number: 5,132,947
[45] Date of Patent: Jul. 21, 1992

[54] COMBINED MEMORY MEDIUM, DRIVE APPARATUS AND METHOD THEREFOR AND PLAYBACK APPARATUS THEREFOR

[75] Inventors: Keiichi Kameda, Kyoto; Kazutsugu Kobayashi, Takatsuki; Nobuyoshi Yokobori, Osaka; Hiroyuki Iitsuka, Katano, all of Japan

[73] Assignee: Matsushita Electric Industrial Co., Ltd., Osaka, Japan

[21] Appl. No.: 318,534

[22] Filed: Mar. 3, 1989

[30] Foreign Application Priority Data

| Mar. 8, 1988 | [JP] | Japan | 63-54213 |
| Sep. 6, 1988 | [JP] | Japan | 63-222705 |
| Sep. 6, 1988 | [JP] | Japan | 63-222706 |
| Sep. 14, 1988 | [JP] | Japan | 63-230403 |

[51] Int. Cl.⁵ .................. G11B 7/00; G11B 23/30
[52] U.S. Cl. .................. 369/32; 369/75.1; 360/133; 356/52
[58] Field of Search .......... 369/32, 258, 44.11, 369/48, 75.1, 756, 58, 124, 272, 273; 371/37.1, 40.2; 356/52

[56] References Cited

U.S. PATENT DOCUMENTS

| 4,814,924 | 3/1989 | Ozeki .................. 360/133 |
| 4,908,793 | 3/1990 | Yamagata et al. .......... 360/97.01 |

FOREIGN PATENT DOCUMENTS

| 0210629 | 2/1987 | European Pat. Off. |
| 56-094565 | 7/1981 | Japan . |
| 59-011478 | 1/1984 | Japan . |
| 60-176187 | 9/1985 | Japan . |
| 61-246886 | 11/1986 | Japan . |
| 62-047793 | 3/1987 | Japan . |
| 62-128084 | 6/1987 | Japan . |
| 0128084 | 6/1987 | Japan .................. 369/258 |
| 0192933 | 8/1987 | Japan .................. 369/44.11 |
| 63-048677 | 3/1988 | Japan . |

OTHER PUBLICATIONS

"ASCII", vol. 10, No.4, Apr. 1986, pp. 115-124.
"ASCII", vol. 10, No. 5, May 1986, pp. 105-115.

Primary Examiner—Roy N. Envall, Jr.
Assistant Examiner—Thang V. Tran
Attorney, Agent, or Firm—Stevens, Davis, Miller & Mosher

[57] ABSTRACT

A combined memory medium is constructed by an optical disc used as a read-only memory, a cartridge for holding or receiving the optical disc, and a fixed memory which is held in the cartridge. The read or write operation for the fixed memory is carried out by structure different from that used for the optical disc so that the optical disc and the fixed memory constitute an integral memory medium. A combined memory medium drive apparatus includes the combined memory medium, a disc access block for reading out the data on the optical disc, a memory access block for performing reading or writing of data for the fixed memory, and a control block for interpreting an instruction sent from an external device to control the reading of data from the optical disc through the disc access block and the reading or writing of data for the fixed memory through the memory access block, in which the optical disc and the fixed memory are complementarily used. A combined memory medium playback apparatus includes the combined memory medium drive apparatus and a processing block for controlling it to process the data output therefrom, thereby being capable of performing writing. Because the control program is stored in the fixed memory, the drive apparatus and the playback apparatus are able to be operated with the combined memory medium alone, dispensing with the need for another memory medium.

4 Claims, 10 Drawing Sheets

INSERTION DIRECTION

INSERTION DIRECTION

COMBINED MEMORY MEDIUM, DRIVE APPARATUS AND METHOD THEREFOR AND PLAYBACK APPARATUS THEREFOR

BACKGROUND OF THE INVENTION

1. Field of the Invention

The present invention relates to a memory medium using an optical disc from which information relative to image, sound, character, music, etc. previously recorded in applications of hobby, education, business, etc. is reproduced in a read-only manner, an apparatus for driving it and an apparatus for playing it back.

2. Description of the Related Art

In recent years, optical discs have been widely used as a recording/reproducing medium for information relative to image, sound, character, music, etc. Such optical discs include an optical video disc, CDV (Compact Disc Video), etc. for image, sound and music, a CD (Compact Disc) for music, a CD-ROM (Compact Disc Read-Only Memory) for computer data, a CD-I (Compact Disc Interactive) for multi-media comprising image, sound, character, music, computer data, etc.

Referring to the drawings, one example of an apparatus for driving a memory medium using the conventional optical disc mentioned above and that of an apparatus for reproducing it will be explained. Now, an English-Japanese dictionary system using CD-ROM will be taken as an example.

Figure 7:
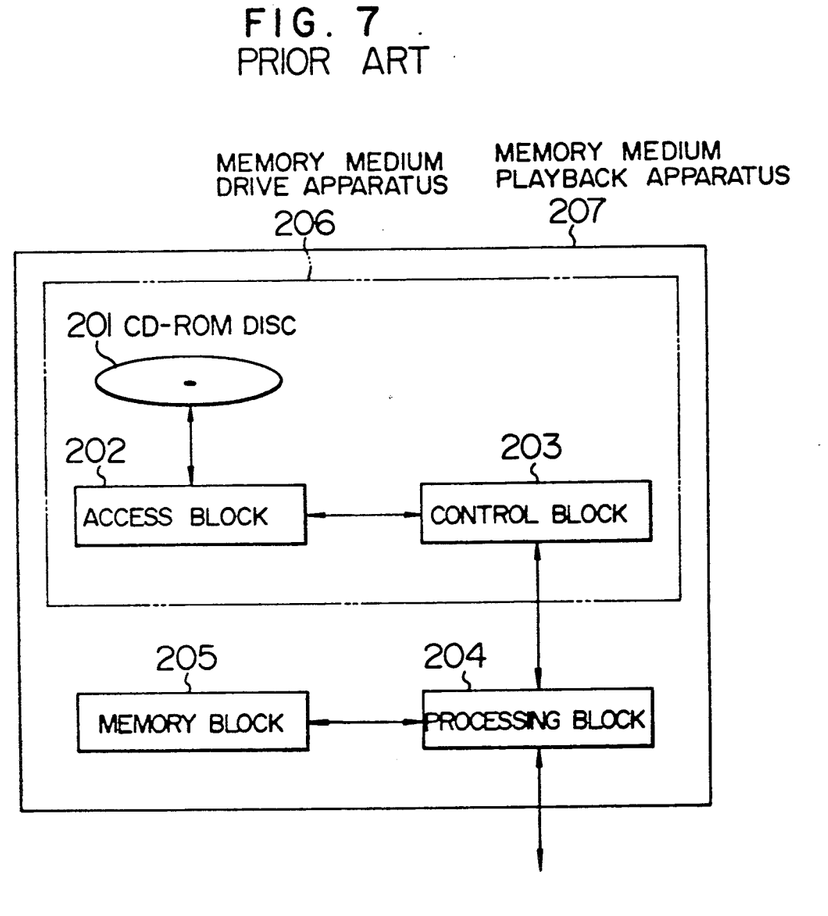
FIG. 7 is a block diagram showing the arrangement of a playback apparatus using the conventional memory medium.

FIG. 7 is a block diagram showing an arrangement of the English-Japanese dictionary system using the conventional memory medium. In this figure, 201 is a CD-ROM disc serving as a memory medium; 202 is an access block; 203 is a control block; 204 is a processing block; 205 is a memory block; 206 is a memory medium driving apparatus; and 207 is a memory medium reproducing apparatus.

The operation of this system will be explained below. It is assumed that a data base of the English-Japanese dictionary information is stored in CD-ROM 201 and the information retrieved therefrom is stored in memory block 205. Memory block 205 is constituted by a floppy disc and a driving device therefor, for example. Now, if a specific word is informed to processing block 204 from the exterior, processing block 204 investigates a position in CD-ROM 201 corresponding to information of the word from the retrieved information stored in memory block 205 and transfers the position information to control block 203. Control block 203 controls access block 202 to output a desired data in CD-ROM 201 and transfers it to processing block 204. The structure of CD-ROM 201, data recording format therein and method for constructing access block 202 are described in "AS-CII", Vol. 10, No. 4, April 1986, pp 115-124 and Vol. 10, No. 5, May 1986, pp 105-115. Processing block 204 performs processing required to display the coded character on a screen or image plane, for example, to provide the information of the specified word. Incidentally, the above processing is performed in a manner such that a control program stored in memory block 205 is previously read out to processing block 204.

The optical disc used as a memory medium in the above arrangement has the following several disadvantages. Information to be stored is prepared beforehand. An original disc is cut to record the information therein. Then a large amount of duplicates are formed, and they are used as read-only devices. Therefore, rewriting of the content thereof and addition of new information thereto can not be carried out. The control program, which is supplied from another medium, is inconvenient to deal with, which makes ambiguous the combination with the optical disc. Even if the control program is stored in the optical disc, it is necessary to reconstruct the optical disc in order to increase the number of its versions. Further, whenever the data output from the optical disc contains an error, the data at the same address must be processed in a data error detection/correction section.

SUMMARY OF THE INVENTION

An object of the present invention is to provide a combined memory medium on which writing free from the above disadvantages can be performed, a drive apparatus therefor and a playback apparatus therefor.

In order to attain the above object, the combined memory medium in accordance with the present invention is constructed by an optical disc used as a read-only memory, a cartridge for holding or receiving the optical disc, and a fixed memory held in the cartridge and the read or write of which is carried out by means different from that for the optical disc so that the optical disc and the fixed memory constitute an integral memory medium. The drive apparatus therefor comprises the combined memory medium, a disc access block for reading out the data on the optical disc, a memory access block for performing the read or write of data for the fixed memory, and a control block for interpreting an instruction sent from an external device to control the read of data from the optical disc through the disc access block and the read or write of data for the fixed memory through the memory access block, in which the optical disc and the fixed memory are complementarily used. The playback apparatus therefor comprises the combined memory medium drive apparatus and a processing block for controlling it to process the data output therefrom. The combined memory medium drive apparatus further comprises a data error detecting/correcting block for detecting a data error included in the data read out and correcting it and provides the control block with a function that, if the data is not corrected in the data error detecting/correcting block, the data is externally output, and, if the data is corrected, the corrected data is externally output and also stored in the fixed memory through the memory access block so that, in subsequently reading out the data at the address where the data error is generated, the corrected data is read out from the fixed memory through the memory access block.

The combined memory in accordance with the present invention is permitted to perform the write operation since the optical disc and the fixed memory are made integral as mentioned above. By storing a control program in the fixed memory, the drive apparatus and the playback apparatus can be operated in the presence of only the combined memory medium without requiring another memory medium. Further, by storing a correct data of the output data with an error, the drive apparatus can be operated with high efficiency.

DESCRIPTION OF THE PREFERRED EMBODIMENTS

Now referring to FIGS. 1 and 2, an explanation will be given for one embodiment of the present invention including a combined memory medium, a combined memory medium drive apparatus and a combined memory medium playback apparatus.

Figure 1A:
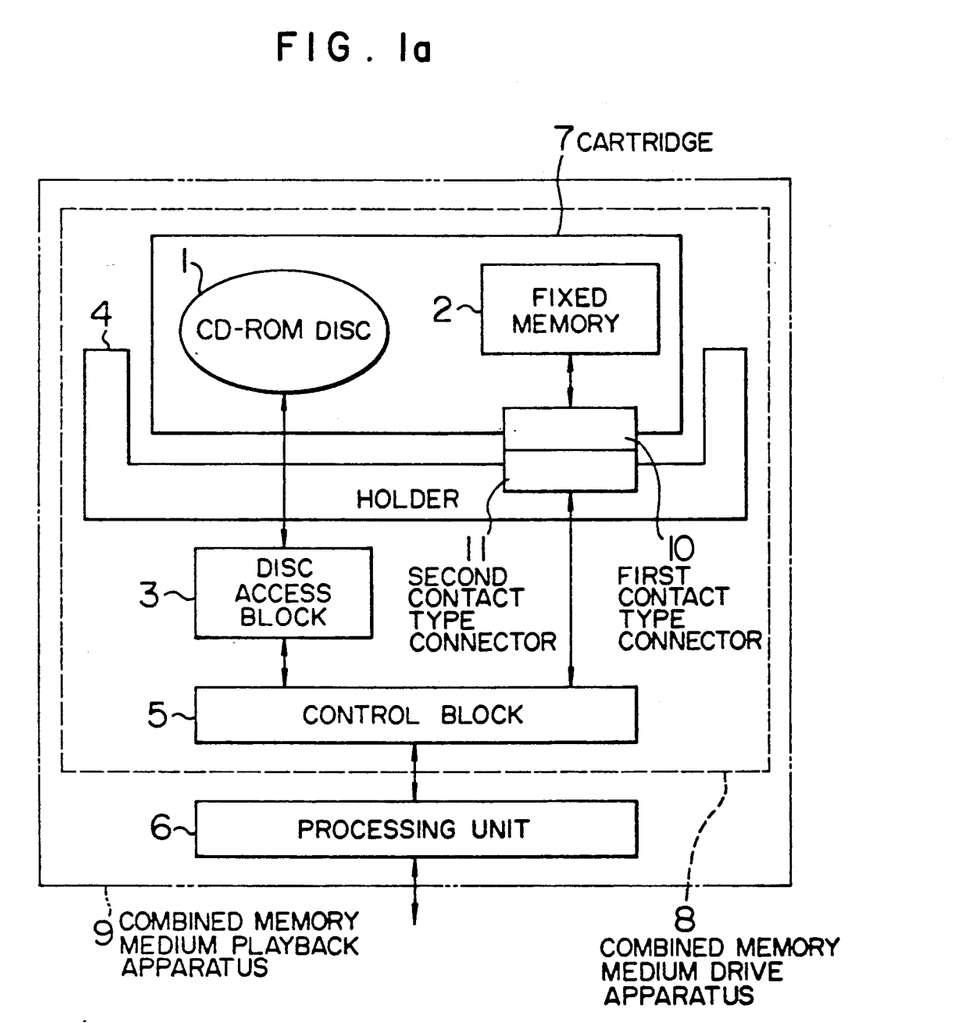
FIGS. 1a and 1b are block diagrams of a combined memory medium playback apparatus in accordance with the present invention, respectively.

FIGS. 1a and 1b are block diagrams of a combined memory medium playback apparatus in accordance with the present invention, respectively. In FIG. 1a, 1 is a CD-ROM disk serving as an optical disc; 2 is a fixed memory; 3 is a disc access block; 4 is a holder; 5 is a control block; 6 is a processing unit; 7 is a cartridge; 8 is a combined memory medium drive apparatus; 9 is a combined memory medium playback apparatus; 10 is a first contact type connector; and 11 is a second contact type connector held in holder 4. In such a system, the combined memory medium, which consists of cartridge 7, CD-ROM disk 1, first contact type connector 10 and fixed memory 2, is adapted to be removable from holder 4. First contact type connector 10 will be connected with second contact type connector 11 in such a state that the combined memory medium is held or mounted in holder 4.

Figure 1B:
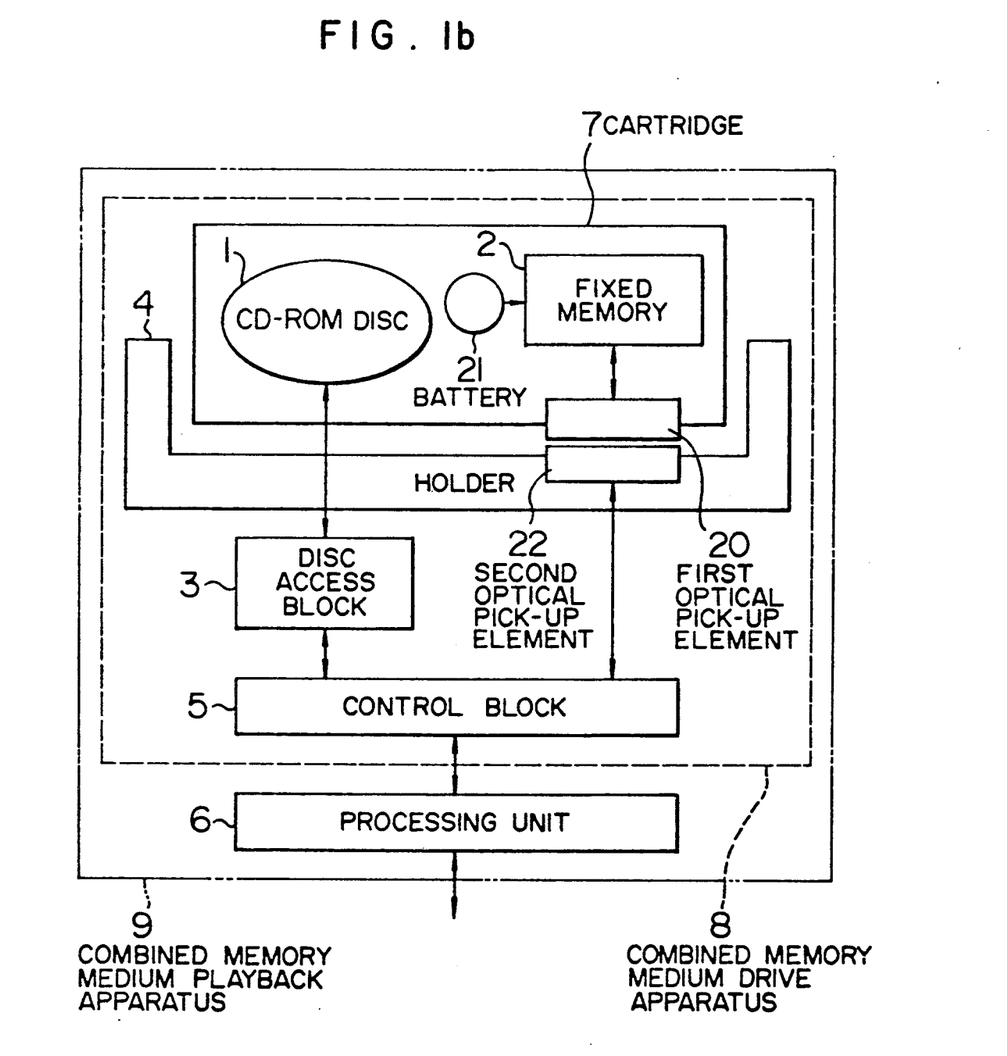

In FIG. 1b, 20 is a first optical pick-up element; 21 is a battery; and 22 is a second optical pick-up element. The other elements in FIG. 1b are referred to by like reference numerals used in FIG. 1a. In such a system, first optical pick-up element 20, battery 21 and fixed memory 2 are attached to cartridge 7. Further, the combined memory medium, which consists of cartridge 7, CD-ROM 1, first optical pick-up element 20, fixed memory 2 and battery 21, is adapted to be removable from holder 4. First optical pick-up element 20 will be opposite to second optical element 22 in such a state that the combined memory medium is held in holder 4.

Figure 2A:
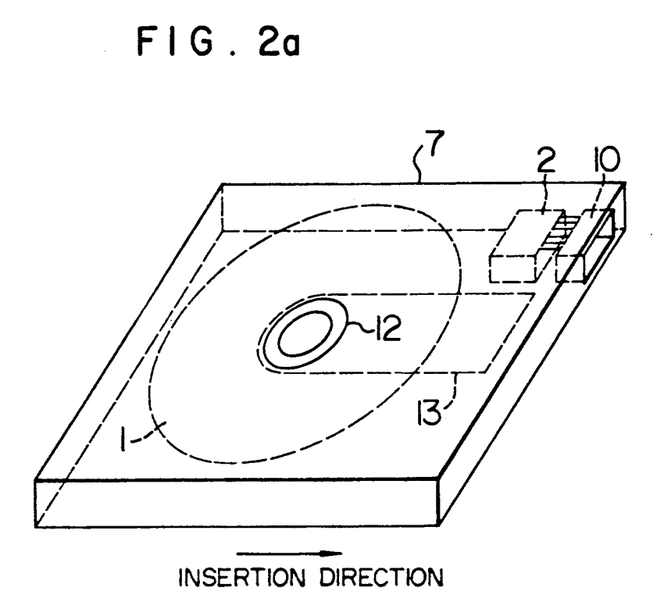
FIGS. 2a and 2c are perspective views of a combined memory medium in accordance with the present invention, respectively.
Figure 2B:
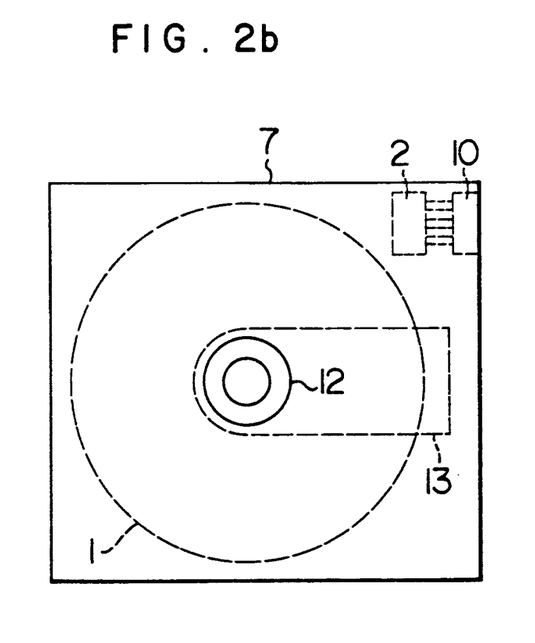
FIGS. 2b and 2d are plan views of a combined memory medium in accordance with the present invention, respectively.

FIGS. 2a and 2b are a perspective view and a plan view of the combined memory medium, respectively, used in the combined memory medium playback apparatus of FIG. 1a. As seen from FIGS. 2a and 2b, cartridge 7 holds CD-ROM disc 1 therein. Cartridge 7 has a hole 13 for reading out the data from CD-ROM disc 1 in its lower surface and a hole 12 for clamping the disc in its upper surface. When disc cartridge 7 is mounted in holder 4, CD-ROM disc 1 is placed on a turn-table (not shown) in access block 3 and clamped there by a disc clamping device (not shown). Thus, CD-ROM disc 1 and cartridge 7 are kept in a non-contact state, and disc access block 3 reads out the information stored in CD-ROM disc 1 through read-hole 13 using a laser beam. On the other hand, fixed memory 2 and first contact connector 10, which are fixed to catridge 7, are connected with each other through signal lines such as an address line, data line, control line, etc. When cartridge 7 is mounted in holder 4, first contact type connector 10 is connected with second contact type connector 11 and thus control block 5 can perform reading or writing of the contents of fixed memory 2.

Figure 2C:
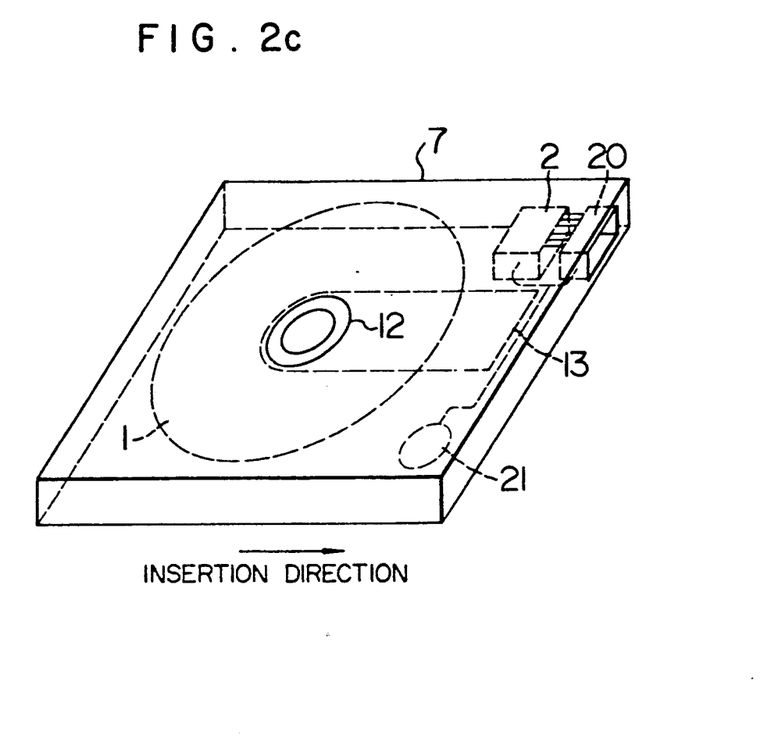
Figure 2D:
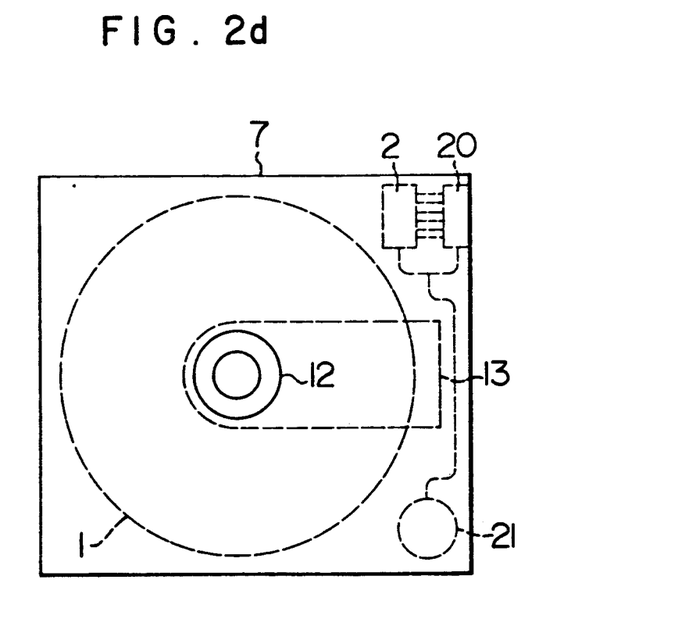

FIGS. 2c and 2d are respectively a perspective view and a plan view of the combined memory medium playback apparatus of FIG. 16. As seen from FIGS. 2c and 2d, cartridge 7 holds CD-ROM 1 therein. As in FIGS. 2a and 2b, cartridge 7 has a hole 13 for reading out the data from CD-ROM disc 1 in its lower surface and a hole 12 for clamping the disc in its upper surface. Fixed memory 2 and first optical pick-up element 20 are connected with each other through a transmission line and a receiving line. In the data reading or writing operation for fixed memory 2, a read or write instruction generated from control block 5 is converted into an optical signal by second optical pick-up element 22 and the optical signal is received by first optical pick-up element 20. The optical signal is converted into an electric signal by first optical pick-up element 20 and the electric signal is sent to fixed memory 2. Fixed memory 2 incorporates therein a memory device and a control circuit for interpreting a read or write instruction to perform reading or writing from or into the memory device. If the instruction is a write instruction, using a specified address and data included in the instruction, the control circuit writes the data at the specified address of the memory device. If the instruction is a read instruction, the control circuit reads out the data at the address of the memory device specified by the instruction and sends the read data to control block 5 through first optical pick-up element 20 and second optical pick-up element 22. Electric power for fixed memory 2 and first optical pick-up element 20 is supplied from battery 21. As fixed memory 2, a memory medium which can be accessed at high speed, e.g. a semiconductor memory, magnetic bubble memory, etc. serving as a read-only memory or a read-write memory is actually used.

CD-ROM disc 1 and fixed memory 2 are complementarily used. Although CD-ROM disk 1 has an advantage of having a larger storage capacity than fixed memory 2, it also has disadvantages of being unable to write or rewrite data, having a low access speed, being unsuitable for mini-scale production, etc. On the other hand, although fixed memory 2 has an advantage of being able to write data, having a higher access speed than CD-ROM disc 1 and being suitable for mini-scale production, it also has disadvantages of having a small storage capacity and being high in the cost per one bit. By packaging such two memory media having different properties in the same catridge 7, the combined memory medium according to the present invention realizes a very efficient memory medium having advantages of both media.

In operation, disc access block 3 reads out the data recorded on CD-ROM disc 1 in accordance with an instruction from control block 5 and sends the read data to control block 5.

In accordance with an instruction from processing unit 6, control block 5 performs the read or write operation of the data in fixed memory 2 through first contact type connector 10 and second contact type connector 11 and performs the read operation from CD-ROM disc 1 by controlling disc access block 3. The data read out from CD-ROM disc 1 is first stored in control block 5 and sent to processing unit 6.

Processing unit 6 serves to process the data sent from control block 5. For example, if the sent data is an image data, processing unit 6 converts the image data into an image signal and outputs it.

As described above, in accordance with this embodiment of the present invention, a combined memory medium is constructed by the optical disc serving as a read-only memory, the cartridge for receiving the optical disc therein, and the fixed memory the read or write operation of which is carried out through the first contact type connector or the first optical pick-up element so that by storing the data for changing or to be added to the contents of the read-only optical disc in the fixed memory, the combined memory medium itself permits writing. Also, since a cartridge is adopted so that the combined memory medium in which the optical disc and the fixed memory are integrated with each other is removable from the holder, the combined memory medium can be easily exchanged.

Further, in accordance with this embodiment, a combined memory medium drive apparatus is constructed by the combined memory medium, the disc access block for reading out the data on the optical disc, the second contact type connector or the second optical pick-up element used to perform the read or write of data for the fixed memory, and a control block for interpreting an instruction sent from an external device to control reading of data from the optical disc through the disc access block and reading or writing of data from or in the fixed memory through the second contact type connector or the second optical pick-up element. And, a combined memory medium playback apparatus is constructed by adding, to the combined memory medium drive apparatus, the processing unit for controlling it to process the data output, therefrom. Therefore, by storing, in the fixed memory, a control program for controlling the combined memory medium drive apparatus and the combined memory medium playback apparatus, the data and control program can be supplied only from the combined memory medium without requiring the supply of the control program from another medium such as a floppy disc. This makes it easy to handle these apparatuses and also eliminates the necessity of considering correspondence between the optical disc and the floppy disc. Moreover, if the control program is previously stored in the optical disc, another control program can be additively recorded in the fixed memory in order to effect version-up and so the optical disc may be used as it is. Further, if the combined memory medium is mounted in a removable state in the disc access block and the memory access means, the combined memory medium can be handled as if it were the optical disc. This permits systems in several applications of education, hobby, business, etc. to be constructed using the combined memory medium containing several kinds of contents.

Although a CD-ROM was used as the optical disc in this embodiment, it should be noted that the invention is not limited thereto; for example, an optical video disc may be used alternatively. In the case of using the optical pick-up elements, a solar battery can be used as a power supply for the fixed memory.

Figure 3:
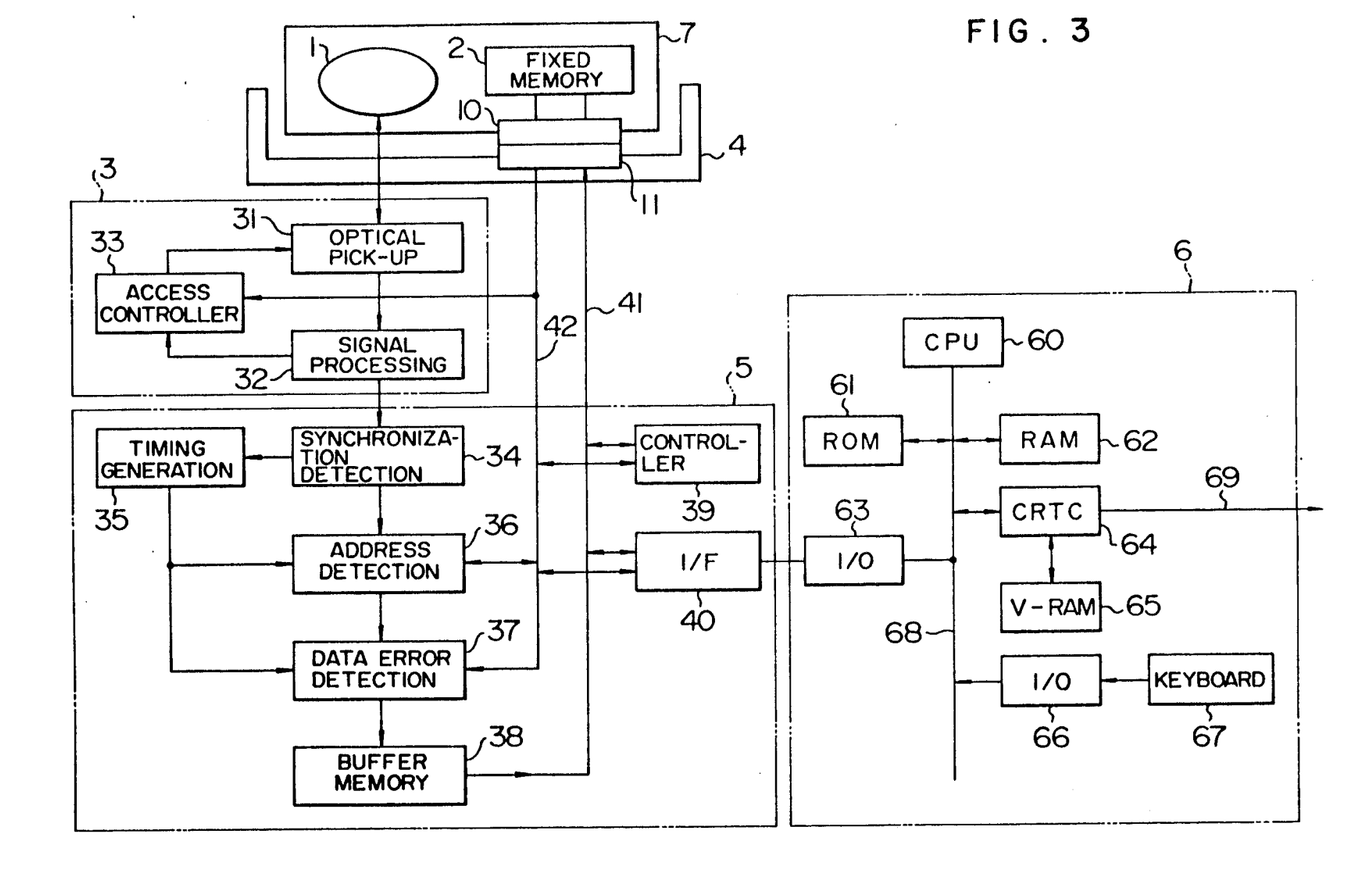
FIG. 3 is a block diagram of a combined memory medium playback apparatus in accordance with the present invention.
Figure 4A:
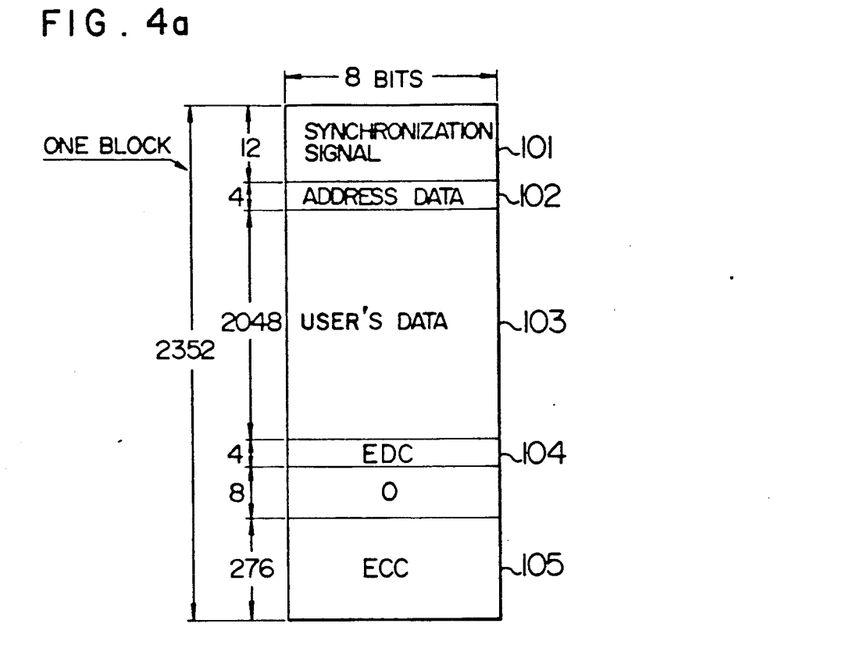
FIGS. 4a and 4b are schematic views showing formats of the data recorded on a CD-ROM disc.
Figure 4B:
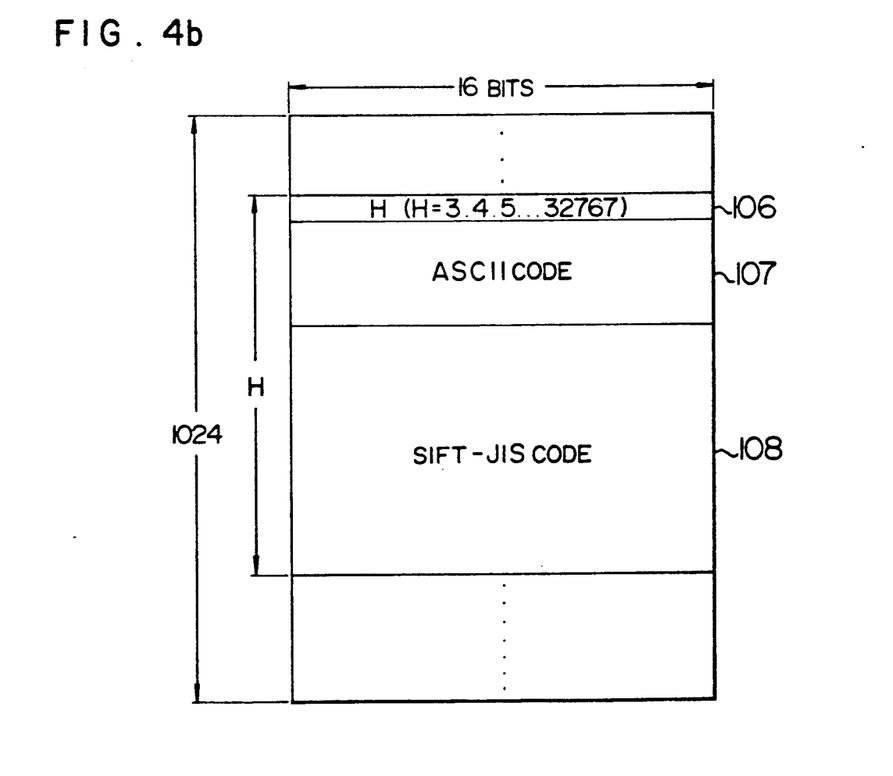
Figure 4C:
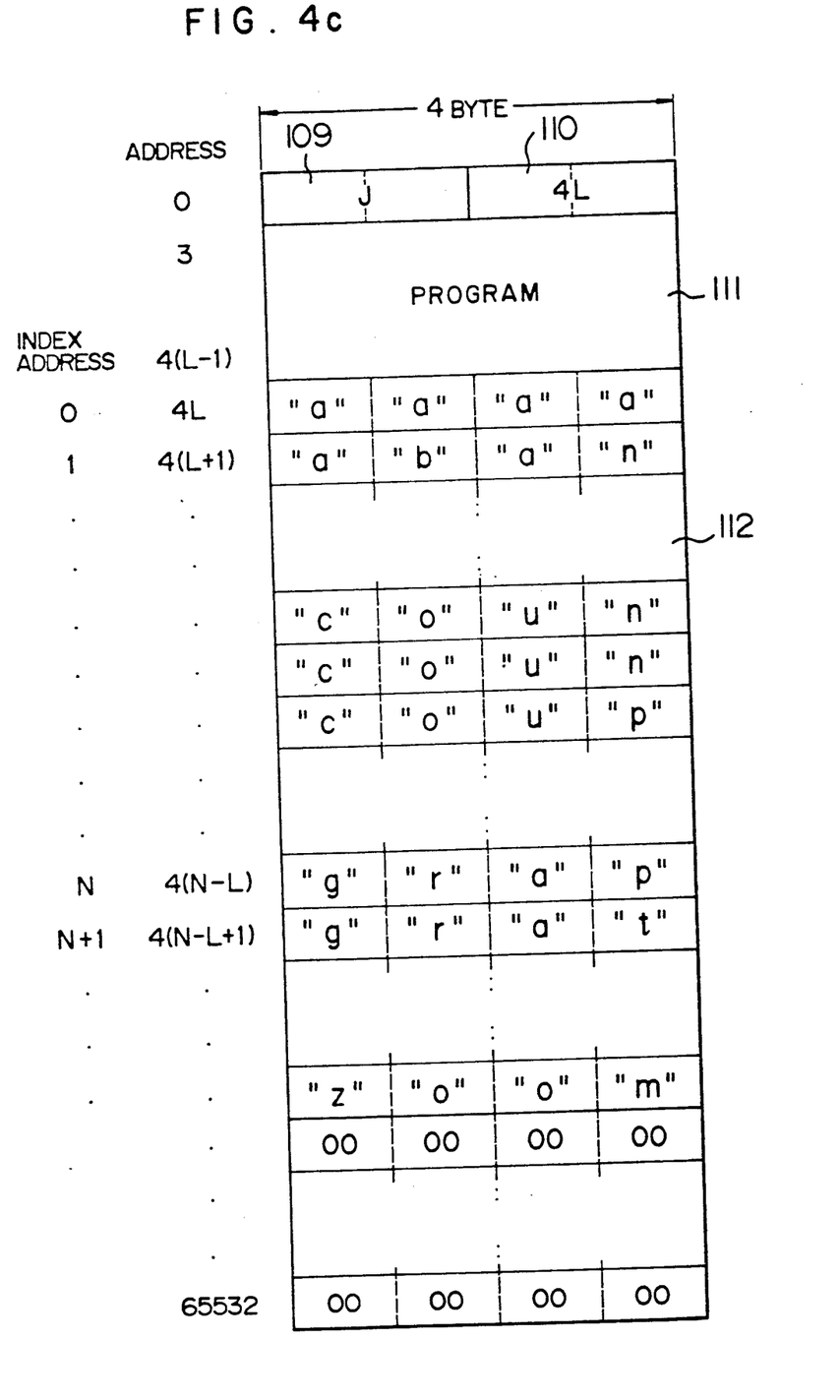
FIG. 4c is a schematic view showing a format of the data recorded in a fixed memory.
Figure 5:
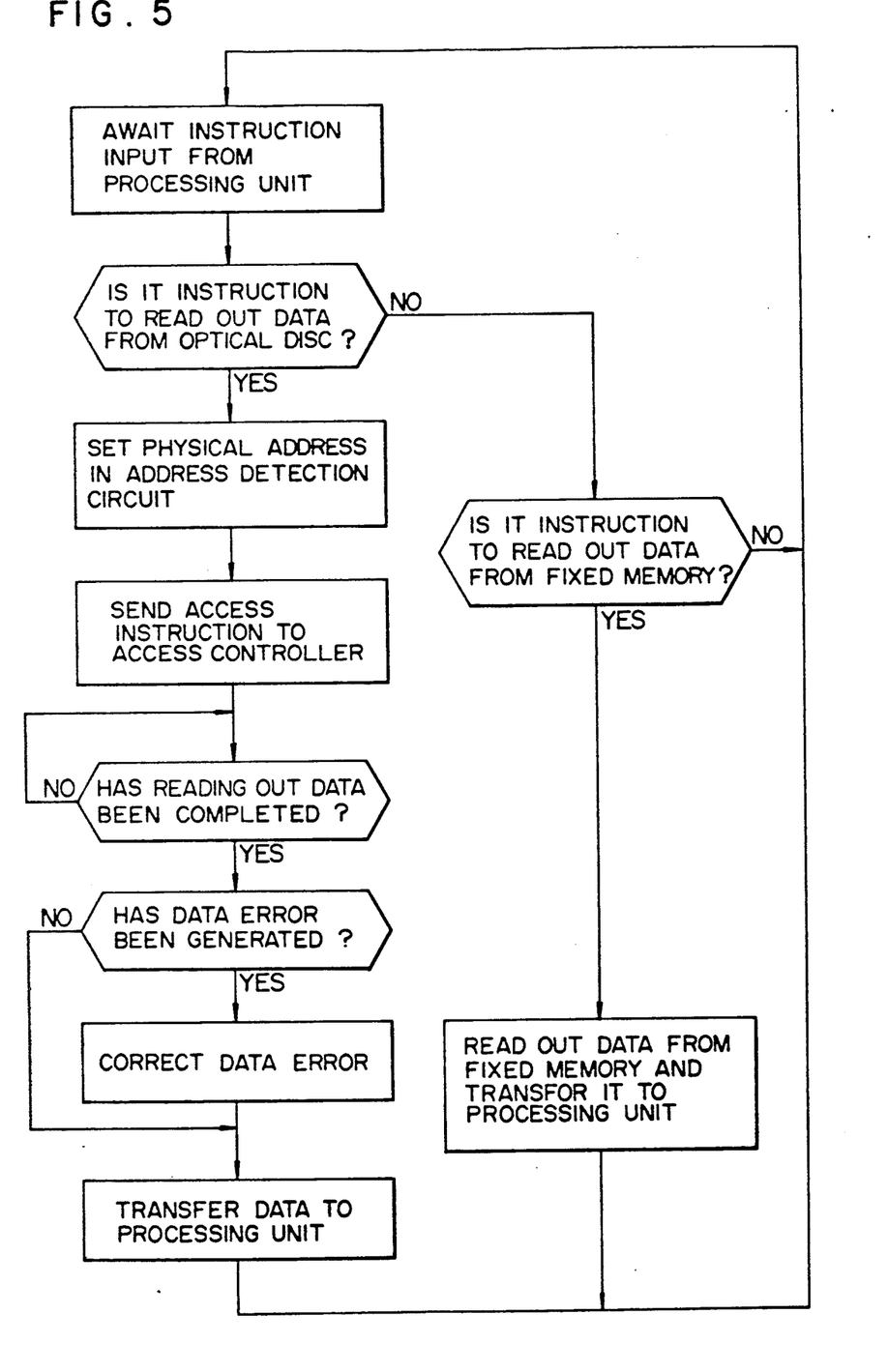
FIGS. 5 and 6 are flowcharts showing the operation of a control block.

Referring to FIGS. 3, 4 and 5, a concrete explanation will be given for a second embodiment of the present invention in which an English-Japanese dictionary is realized using the combined memory playback device according to the present invention. In this embodiment, a CD-ROM disc is used as optical disc 1 and a ROM (read-only memory) is used as fixed memory 2. FIG. 3 is a block diagram of the combined memory medium playback apparatus in accordance with the present invention. FIGS. 4a and 4b are schematic views showing formats of the data recorded on CD-ROM disc 1. FIG. 4c is a schematic view showing a format of the data recorded in fixed memory 2. FIG. 5 is a flowchart showing the operation of control block 5.

First, with reference to FIGS. 4a-4c, an explanation will be given for the data recorded in CD-ROM disc 1 and fixed memory 2. CD-ROM disc 1 serves to record a general digital data on an area on which music in a compact disc is to be recorded, and it is formatted using blocks each consisting of 2352 bytes as shown in FIG. 4a. Each block consists of, from its head, a synchronization signal 101 of 12 bytes, an address data 102 of 4 bytes, user's data 103 of 2048 bytes, an error detection code (hereinafter referred to as EDC) 104 of 4 bytes, a null data of 8 bytes and an error correction code (hereinafter referred to as ECC) 105 of 276 bytes.

Address data (area) 102 records the position of the associated block on CD-ROM disc 1. More concretely, address data 102 records the physical address of that block in 3 bytes, from the head, using minutes, seconds and blocks. 75 blocks correspond to one second in a time unit.

User's data (area) 103 records word data of the English-Japanese dictionary. The record format of the word data is diagramatically shown in FIG. 4b. One word data consists of, from the head, areas of a length 106 of one word (one word=16 bits), a headword 107 and a meaning data 108. Length 106 indicates the data amount of these three areas in the number of words.

Headword 107 is recorded as a 8 bit data (1 byte data) consisting of a 7 bit ASCII code and one bit "0" added at a higher order than it. If the data amount of headword 107 is odd bytes, the headword is recorded as even byte data by adding one byte null data. Meaning data 108 is recorded in Japanese using the sift JIS code in which one character is represented by one word.

Although user's data 103 in one block has a fixed-length, each word data has a voluntary-length. Therefore, plural word data may be included in user's data 103 of one block or one word data may be extended over user's data of plural blocks. However, length 106 and meaning data 107 must be necessarily arranged in the same block. To this end, if the edge of user's data 103 is located at the boundary between length 106 and headword 107 or within headword 107, adjustment is made by inserting null data between the previous word data and the associated word data.

Sift JIS code is a 16 bit code with the most significant bit being always 1. On the other hand, headword 107 and length 106 have always the most significant bit of 0, respectively. Therefore, the boundary between the word data can be easily detected by checking the most significant bit of the word data.

The above word data are recorded in an alphabet order from the block of one minute zero second zero block.

FIG. 4c is a schematic view of the format of data recorded in fixed memory 2. Fixed memory 2 consists of two EPROM's (Erasable Programmable Read Only Memory) each having a storage capacity of 32 bytes, thus providing a total storage capacity of 64 bytes. A length (area) 109 of 2 bytes starting from the address 0 indicates the size of the program recorded from the address 3 in the number of bytes. An index table start address 110 of 2 bytes starting from the address 2 indicates the starting address of the index table. The area starting from the address 3 records a program 111 to be executed by CPU 60 (see FIG. 3). The area starting from the address 4L records an index table 112. Index table 112 indicates correspondence between address data 102 and the word data recorded in user's data of the associated block.

Index table 112 is a collection of indexes each having 4 bytes, in which one index corresponds to one block in CD-ROM disc 1. Each index is provided with an index address assuming the leading index of index table 112 as zero. The index records therein the leading four characters of the headword of the word data recorded in the block corresponding to that index in a small character ASCII code. If plural word data exist in one block, the headword of the leading word data is used. If the headword is shorter than four characters, "a" in the ASCII code is added. If only meaning data 108 exists in the block, the same index as the previous index is recorded. A null data is recorded to indicate the final position of index table 112.

The data amount of English-Japanese dictionary is generally about 4M byte in a small scale dictionary of 500 pages or so, and is about 40M bytes in a large scale dictionary of 3000 pages or so. In this embodiment, the data amount of character data of 20M byte is assumed. The data amount of 20M bytes corresponds to that of $10^3$ blocks. If the index of 4 bytes is allotted to each of the $10^3$ blocks, the capacity of index table 112 is 40K bytes. Thus, the maximum capacity of program 111 in this embodiment is 24K bytes.

The operation of this embodiment will be explained with reference to FIGS. 3 and 5.

In FIG. 3, 31 is an optical pick-up which reads out the data in CD-ROM disc 1. 32 is a CD signal processing circuit which converts the signal sent from optical pick-up 31 into a digital data, thereafter performs error correction inherent to CD therefor and the error-corrected data in the block as shown in FIG. 4 CD signal processing circuit 32 also separates a sub-code data recorded in a time-division manner from an audio data and sends it to an access controller 33. The sub-code data records therein a sub-code address used to access CD-ROM disc 1 by access controller 33. Access controller 33 receives an access instruction from a controller 39 through a control bus 42 and performs the shift control for optical pick-up 31 comparing the received access instruction with the sub-code address. Optical pick-up 31, CD signal processing circuit 32 and access controller constitute disc access block 3. The operation of this block, the sub-code data and the sub-code address will not be explained here, since they are discussed in detail in the references mentioned above.

Control block 5 is constituted by a synchronization detection circuit 34, a timing generation circuit 35, an address detection circuit 36, an error detection circuit 37, a buffer memory 38, a controller 39 and an interface circuit 40. Control block 5, in accordance with an instruction sent from processing unit 6 through interface circuit 40, reads out the data from CD-ROM disc 1 or fixed memory and sends the read-out data to processing unit 6.

Synchronization detection circuit 34 detects synchronization signal 101 from the data from CD signal processing circuit 32. This synchronization signal resets timing generating circuit 35 to start the operation thereof, and then a timing signal is sent to address detection circuit 36 and error detection circuit 37, respectively. Address detection circuit 37 detects coincidence of address data 102 with a physical address. The physical address is set by controller 39 through a control bus 42. Error detection circuit 37 executes error detection in a real time using EDC 104. Buffer memory 38 stores data in a block except synchronization signal 101. If an error is not detected by error detection circuit 37, controller 39 sends out only user's data 103 within the block stored in buffer memory 38 to processing unit 6 through interface circuit 40. If an error is generated, error detection circuit 37 informs controller 39 of the generation of an error through control bus 42. Controller 39 executes error correction using ECC 105 in the block stored in buffer memory 38. Thereafter, the corrected data is sent to processing unit 6 through interface circuit 40.

If the instruction sent from processing unit 6 is a data read-out instruction from fixed memory 2, controller 39 reads out the data in fixed memory 2 through first contact type connector 10, second contact type connector 11 and data bus 41. The data read out is sent in byte units to processing unit 6 through interface circuit 42. The above operation of control block 5 is illustrated in a flowchart of FIG. 5.

Processing unit 6 is constructed by a personal computer comprising a CPU (Central Processing Unit) 60, a ROM (Read Only Memory) 61, a RAM (Random Access Memory) 62, an I/O port 63, a CRTC (CRT Controller) 64, a V-RAM (Video RAM) 65, an I/O port 66 and a key board 67.

In operation, first, in accordance with a program recorded in ROM 61, CPU 60 sends out a read-out instruction for fixed memory 2 to control block 5 through I/O port 63. Control block 5 sends the data shown in FIG. 4 to processing unit 6 in the procedure mentioned above. This data is stored in RAM 62 through a system bus 68. Thereafter, CPU 60 executes program 111 stored in RAM 62. Now if CPU 60 is informed of a specific word from keyboard 67 through I/O port 66, CPU 60 searches the position of the word data in CD-ROM 1 using index table 112 stored in RAM 62 and transfers its physical address to control block 5. For example, if the word "grand" is input, CPU 60 searches index table 112 and obtains the index address N where the word is recorded (see FIG. 4c). This block address N is converted to time information consisting of minutes, seconds and blocks. In this embodiment, the index address 0 corresponds to one minute, zero second, zero block so that the physical address is provided by adding one minute, zero second, zero block to the time information. This physical address is sent to control block 5. Control block 5 controls disc address block 3 in the manner as mentioned above so as to output the desired data from CD-ROM 1 and transfers the data to processing unit 6. Processing unit 6 once stores the received data in RAM 62. CPU 60 retrieves the data to detect the word data "grand". CPU 60 converts this word data in a bit map data using the font data recorded in ROM 61, and transfers the bit map data to V-RAM 65 through CRTC 64. CRTC 64 converts the bit map data stored in V-RAM 65 into an image signal 69 and outputs the image data to an external device. Image signal 69 is displayed on an external CRT display (not shown).

All of the above successive processings carried out by CPU 60 are described on program 111.

This embodiment realizes a combined memory medium utilizing the characteristic of each memory medium in such a manner that character data having large capacity and unchanged contents are recorded in CD-ROM disc 1, whereas the index table having small capacity and a program which depends upon the personal computer to be used is recorded in fixed memory 2.

Incidentally, although a ROM was used as the fixed memory in this embodiment, a write-enable non-volatile memory may be added to the fixed memory. In this case, by recording the headword of the retrieved word in this non-volatile memory, it is possible to inform a user of the word retrieved plural times. Further, although in this embodiment, the program executed by the processing unit was recorded in the fixed memory, a program to be executed by the control block may be recorded there.

Figure 6:
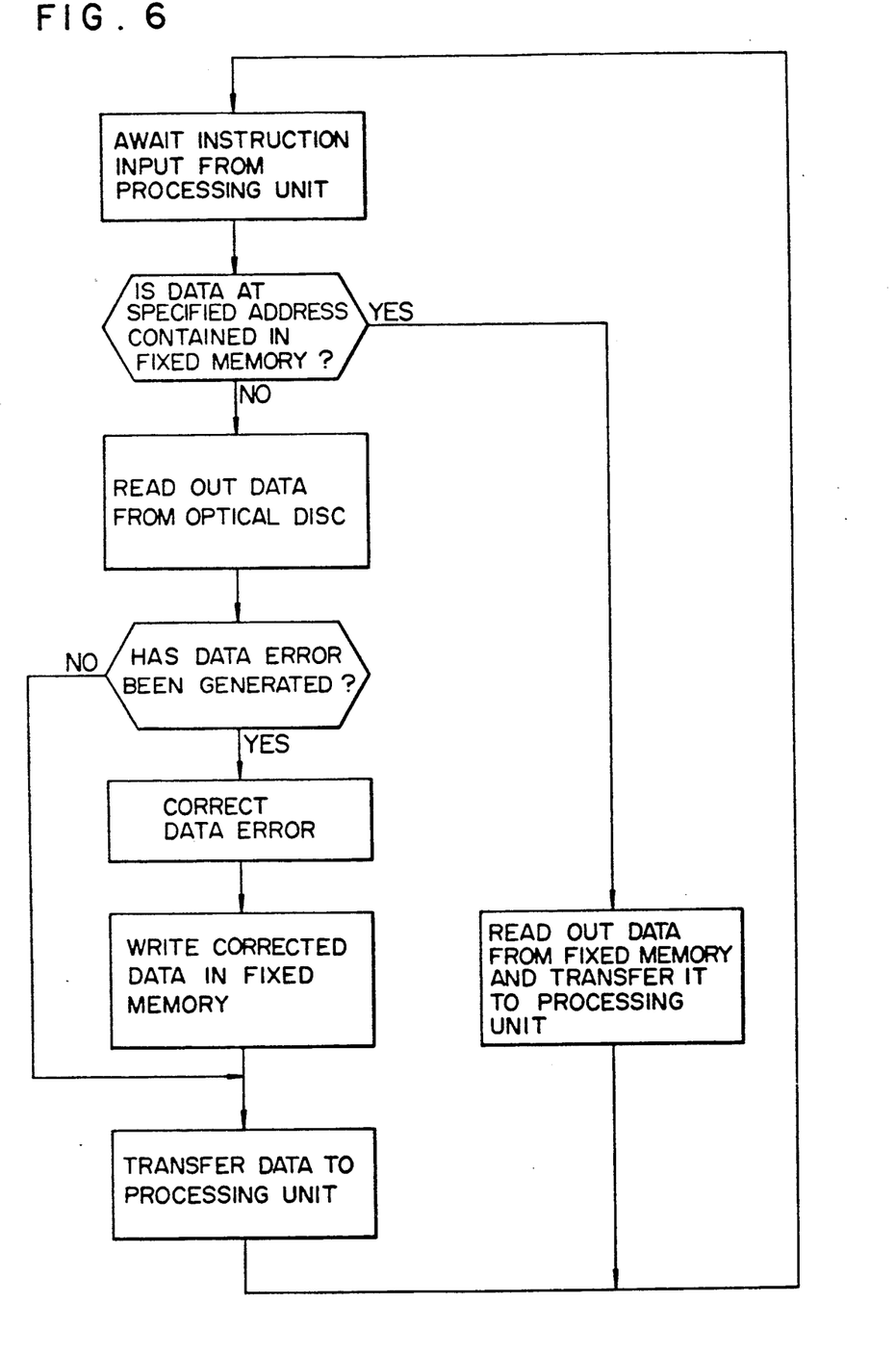

A third embodiment of the present invention will be explained with reference to FIGS. 3, 4a and 6. FIG. 6 is a flowchart showing the flow of the processings performed by control block 5.

Also in this embodiment, CD-ROM disc 1 is used as the optical disc. As the fixed memory, a write-enable non-volatile memory is used. In an initial state, nothing is recorded there.

If a read-out instruction for CD-ROM 1 is input, in this initial state, from processing unit 6 to control block 5, the data in a desired block is stored in buffer memory 38 in the procedure explained in connection with the second embodiment. If a data error for this block is not detected by error detection circuit 37, user's data 103 is sent to processing unit 6. On the other hand, if a data error is detected, controller 39 executes error correction for user's data 103 using ECC 105. The error-corrected data is sent to processing unit 6 and also written in fixed memory 2 by controller 39. Then, controller 39 also writes, in fixed memory 2, address data 102 of the block where a data error has been generated.

Thereafter, when a read-out instruction for CD-ROM 1 is input from processing unit 6 to control block 5, controller 39 checks if user's data 103 in a desired block has been recorded in fixed memory 2. For this checking, address data 102 recorded in fixed memory 2 is used. If it is found as a result of the checking that a desired data exists in fixed memory 2, controller 39 reads out the data and sends it to processing unit 6. In this case, controller 39 does not read out the data from CD-ROM disc 1.

The above-mentioned flow of the processings in control block 5 is such as shown in FIG. 6.

In accordance with this embodiment, the data at the address, where a data error has been generated, can be read out from fixed memory, but not from the optical disc, and the necessity of executing correction, each time a data error for the data at the same is generated, can be removed.

Although the combined memory medium playback apparatus using contact type connectors has been explained in the second and third embodiments, a combined memory medium playback apparatus using optical pick-up elements instead of the contact type connectors can provide the same effect.

What is claimed is:

1. A combined memory medium drive apparatus comprising:

a combined memory medium which comprises an optical disc constituting a read-only memory, a cartridge for holding or receiving said optical disc, a first memory held in said cartridge, and a first light emitting/detecting means for transmitting data for writing to and for receiving data for reading from said first memory, respectively;

a holder for holding said combined memory medium in a removable state;

disc access means for reading out data from said optical disc;

memory access means, including a second light emitting/detecting means which is disposed opposite to said first light emitting/detecting means when said combined memory medium is held in said holder, for performing reading and writing of data from and in said first memory, respectively, when said combined memory medium is held in said holder; and control means for interpreting an instruction sent from an external device to control reading of data from said optical disc through said disc access means and reading and writing of data from and in said first memory, respectively, through said memory access means.

2. A combined memory medium drive apparatus comprising:

a combined memory medium which comprises an optical disc constituting a read-only memory, a cartridge for holding or receiving said optical disc, a first memory held in said cartridge, and a first light emitting/detecting means for transmitting data for writing to and for receiving data for reading from said first memory, respectively;

a holder for holding said combined memory medium in a removable state;

disc access means for reading out data from said optical disc;

memory access means for cooperating with said first light emitting/detecting means to perform reading and writing of data from and in said first memory, respectively;

data error detection/correction means for detecting and correcting a data error present in the read-out data; and control means for interpreting an instruction sent from an external processing device to read out data at a corresponding address in said optical disc through said disc access means and controlling reading from and writing in said first memory, respectively, through said memory access means such that, if the read-out data is normal and is not corrected by said data error detection/correction means, the read-out data is externally outputted, and, if the read-out data is corrected by said data error detection/correction means, the corrected data is both externally outputted and stored in said first memory through said memory access means such that, when subsequently reading out data at an address corresponding to said read-out data corrected by said data error detection/correction means, the corrected data is read out from said first memory through said memory access means.

3. A combined memory medium playback apparatus comprising:

a combined memory medium drive apparatus; and processing means for controlling said combined memory medium drive apparatus to process data outputted therefrom, said combined memory medium drive apparatus comprising:

a combined memory medium which comprises an optical disc constituting a read-only memory, a cartridge for holding or receiving said optical disc, a first memory held in said cartridge, and a first light emitting/detecting means for transmitting data for writing to and for receiving data for reading from said first memory, respectively;

a holder for holding said combined memory medium in a removable state;

disc access means for reading out data from said optical disc;

memory access means for cooperating with said first light emitting/detecting means to perform reading and writing of data from and in said first memory, respectively; and control means for interpreting an instruction sent from an external device to control reading of data from said optical disc through said disc access means and reading and writing of data from and in said first memory, respectively, through said memory access means.

4. A combined memory medium playback apparatus comprising:

a combined memory medium drive apparatus; and processing means for controlling said combined memory medium drive apparatus to process data outputted therefrom, said combined memory medium drive apparatus comprising:

a combined memory medium which comprises an optical disc constituting a read-only memory, a cartridge for holding or receiving said optical disc, a first memory held in said cartridge, and a first light emitting/detecting means for transmitting data for writing to and for receiving data for reading from said first memory, respectively;

a holder for holding said combined memory medium in a removable state;

disc access means for reading out data from said optical disc;

memory access means for cooperating with said first light emitting/detecting means to perform reading and writing of data from and in said first memory, respectively; and control means for interpreting an instruction sent from an external device to control reading of data from said optical disc through said disc access means and reading and writing of data from and in said first memory, respectively, through said memory access means, wherein a control program required to operate one of said control means and said processing means is recorded in said first memory, and, in accordance with the control program, said control means controls reading of data from said optical disc and controls reading and writing of data from and in said first memory medium, respectively, and said processing means controls said combined memory medium drive apparatus to process the data outputted therefrom.

* * * * *